(12) United States Patent  (10) Patent No.: US 8,298,051 B2
Watson  (45) Date of Patent: Oct. 30, 2012

(54) GAME CARCASS RETRIEVAL AND PROCESSING SYSTEMS

(76) Inventor: Chris Watson, Harleton, TX (US)

( * ) Notice: Subject to any disclaimer, the term of this patent is extended or adjusted under 35 U.S.C. 154(b) by 7 days.

(21) Appl. No.: 12/987,053

(22) Filed: Jan. 7, 2011

(65) Prior Publication Data

US 2012/0178352 A1  Jul. 12, 2012

(51) Int. Cl.
A22C 21/00  (2006.01)

(52) U.S. Cl. .......................................... 452/187

(58) Field of Classification Search .......... 452/187–192; 414/462, 539–542; 212/179, 180, 294, 299; 254/325, 283, 284, 335
See application file for complete search history.

(56) References Cited

U.S. PATENT DOCUMENTS

| | | | |
|---|---|---|---|
| 5,662,451 A | 9/1997 | Muzzi et al. | |
| 5,915,334 A | 6/1999 | Cummings et al. | |
| 6,609,481 B1 | 8/2003 | McCarty | |
| 6,638,001 B1 | 10/2003 | McKinley | |
| 7,293,951 B2 | 11/2007 | Meeks | |
| 7,544,032 B1 * | 6/2009 | Scott, Jr. | 414/462 |
| 7,547,024 B1 | 6/2009 | Dell | |
| 7,549,545 B1 | 6/2009 | Ashmore | |
| 7,845,622 B1 * | 12/2010 | Riggs | 254/326 |
| 7,878,484 B2 * | 2/2011 | Kitchens, Sr. | 254/326 |
| 7,931,524 B2 * | 4/2011 | McKenzie | 452/187 |
| 2005/0254925 A1 | 11/2005 | Braquet | |
| 2006/0182571 A1 | 8/2006 | Hightower | |

* cited by examiner

*Primary Examiner* — Richard Price, Jr.
(74) *Attorney, Agent, or Firm* — Shannon W. Bates; Klemchuk Kubasta LLP

(57) ABSTRACT

The problems presented in hunting industry are solved by the systems and methods of the present invention. In accordance with one embodiment of the present invention, a game carcass retrieval system is provided. The game carcass retrieval system has a frame and a removable retrieving head. The head may be attached to a game carcass and then retracted by a winch attached to the frame. The winch may pull the carcass into an upright position that allows for easy loading into a vehicle or easy processing of the game carcass. The head may rotate to provide for easy processing. An additional processing table may be attached to the game carcass retrieval system to assist in processing. The table may include a grapple that help to pull meat away from the carcass and a skinning arm to further separate the meat from the carcass.

5 Claims, 11 Drawing Sheets

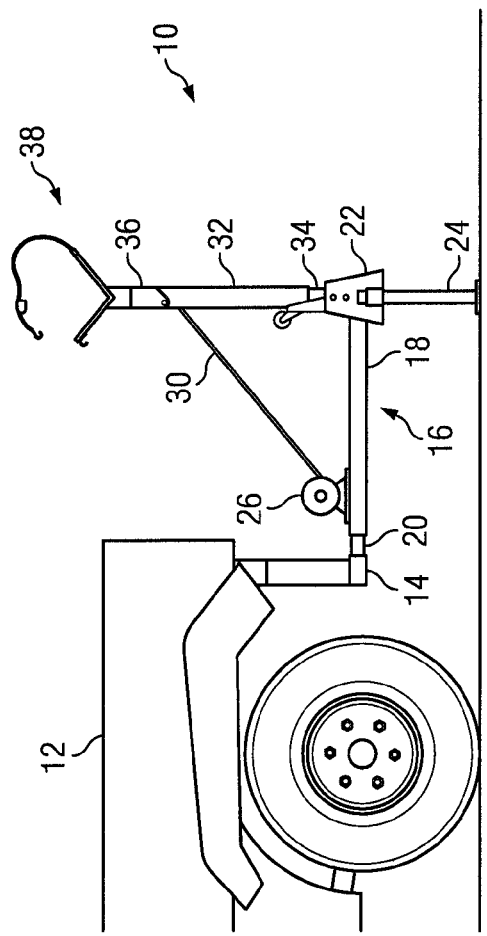
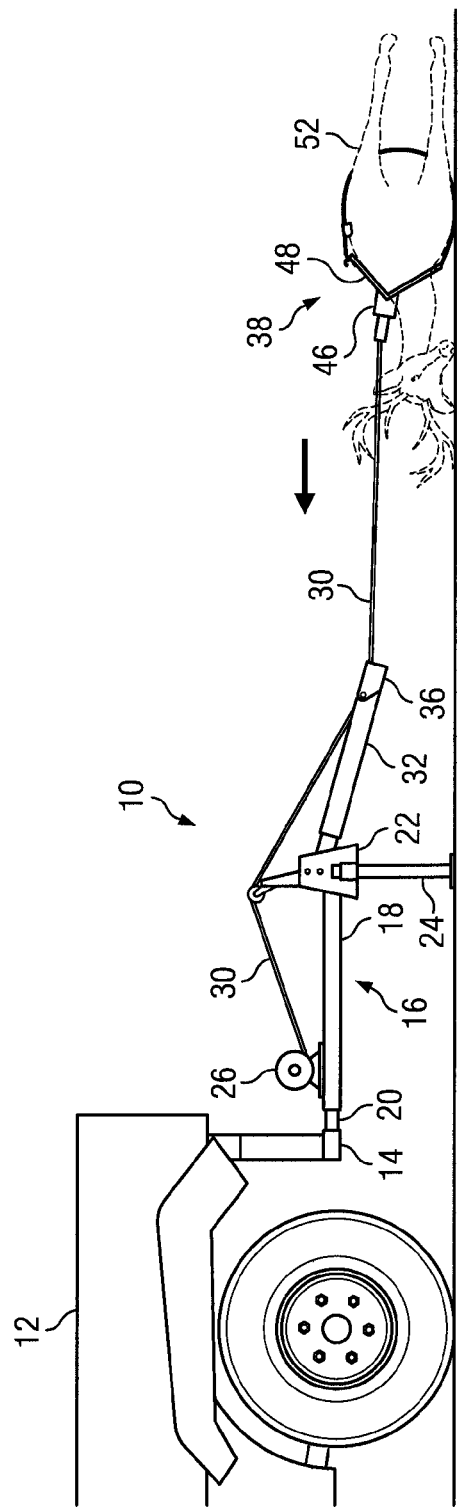

GAME CARCASS RETRIEVAL AND PROCESSING SYSTEMS

BACKGROUND

1. Field of the Invention

The present invention relates generally to apparatus and system for retrieving and processing wild game carcasses.

2. Description of Related Art

Within the hunting industry, and in particular within the large game market, hunters often struggle to retrieve game that is taken in rough brush or that is larger than the hunter can reasonably handle.

A need exists, therefore, for an apparatus and system to retrieve game and position the game for cleaning and processing, if desired.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems presented in hunting industry are solved by the systems and methods of the present invention. In accordance with one embodiment of the present invention, a game carcass retrieval system is provided. The game carcass retrieval system has a frame and a removable retrieving head. The head may be attached to a game carcass and then retracted by a winch attached to the frame. The winch may pull the carcass into an upright position that allows for easy loading into a vehicle or easy processing of the game carcass. The head may rotate to provide for easy processing. An additional processing table may be attached to the game carcass retrieval system to assist in processing. The table may include a grapple that help to pull meat away from the carcass and a skinning arm to further separate the meat from the carcass.

Other objects, features, and advantages of the present invention will become apparent with reference to the drawings and detailed description that follow.

BRIEF DESCRIPTION OF THE DRAWINGS

FIGS. 5A-5F is a scene-by-scene demonstration of how the game carcass system may be used to retrieve a game carcass;

DETAILED DESCRIPTION OF THE PREFERRED EMBODIMENT

All references cited herein are incorporated by reference to the maximum extent allowable by law. To the extent a reference may not be fully incorporated herein, it is incorporated by reference for background purposes and indicative of the knowledge of one of ordinary skill in the art.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
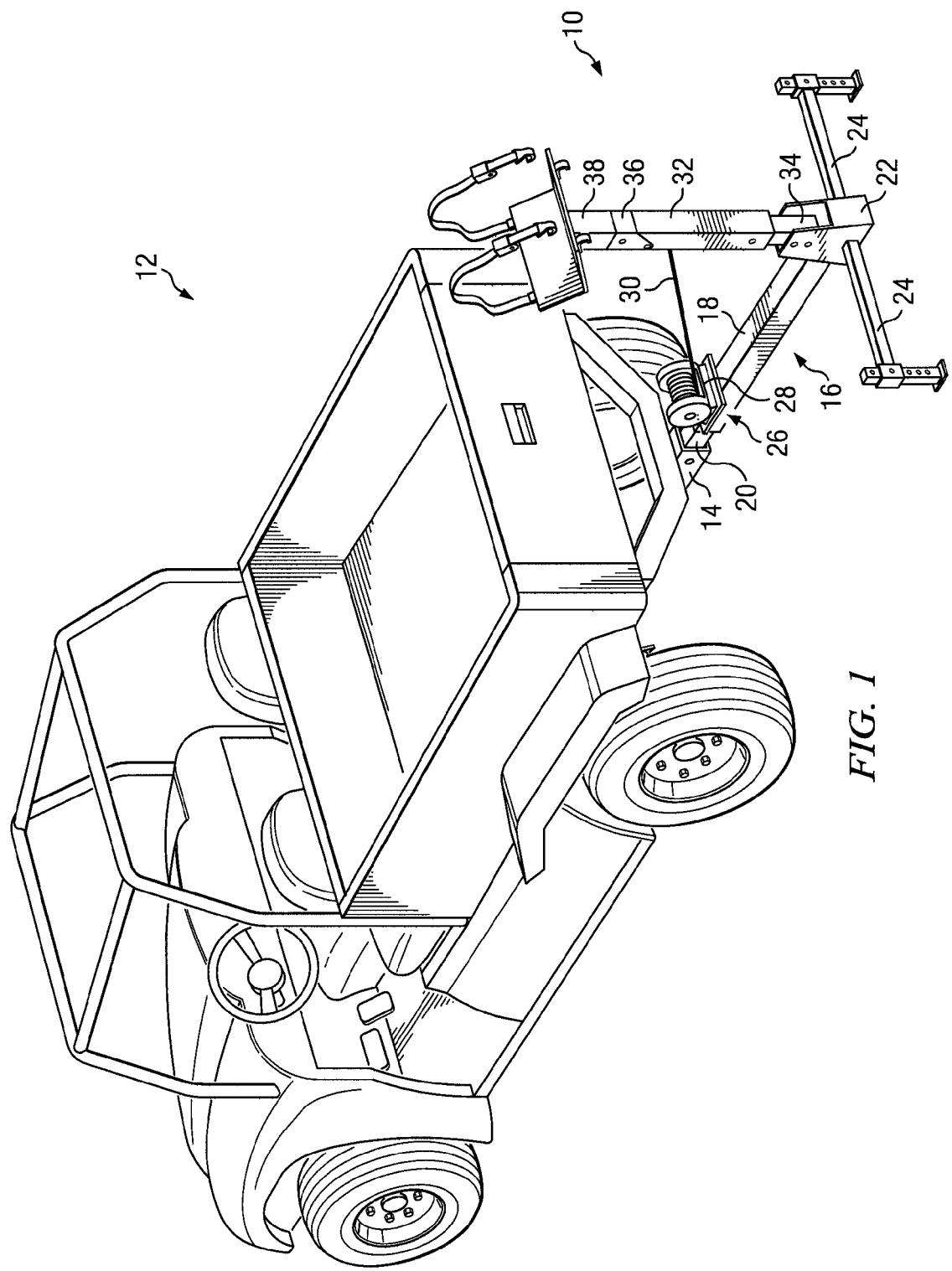
FIG. 1 is an overview of a game carcass system attached to a vehicle.

FIG. 1 is an overview of a game carcass system 10 attached to a vehicle 12. The vehicle 12 shown is an off road vehicle commonly used by hunters, although the game carcass system may be attached to other off road vehicles as well as on road vehicles, such as trucks or SUVs, that have a hitch receiver 14. The carcass system has a frame 16 having a main arm 18 attached to the hitch receiver 14 by a receiver adapter 20. Receiver adapter 20 is sized to fit the hitch receiver 14, some common sizes being 1.25 inch or 2 inch square. At the opposite end of the main arm 18 from the receiver adapter 20 is the pivot mount 22. Pivot mount 22 is shown with optional outriggers 24 extended to provide additional support to frame 16. When carcass system 10 is used on full sized vehicles 12 outriggers 24 may not be necessary.

Mounted near the receiver adapter 20 along main arm 18 is winch 26 having a drum 28 and rope 30 wrapped around drum 28 and extending therefrom. A adjustable retrieval arm 32 is pivotally mounted to frame 16 at pivot mount 22 by a first end 34. A second end 36 of adjustable retrieval arm 32 supports a retrieval head 38.

Figure 2:
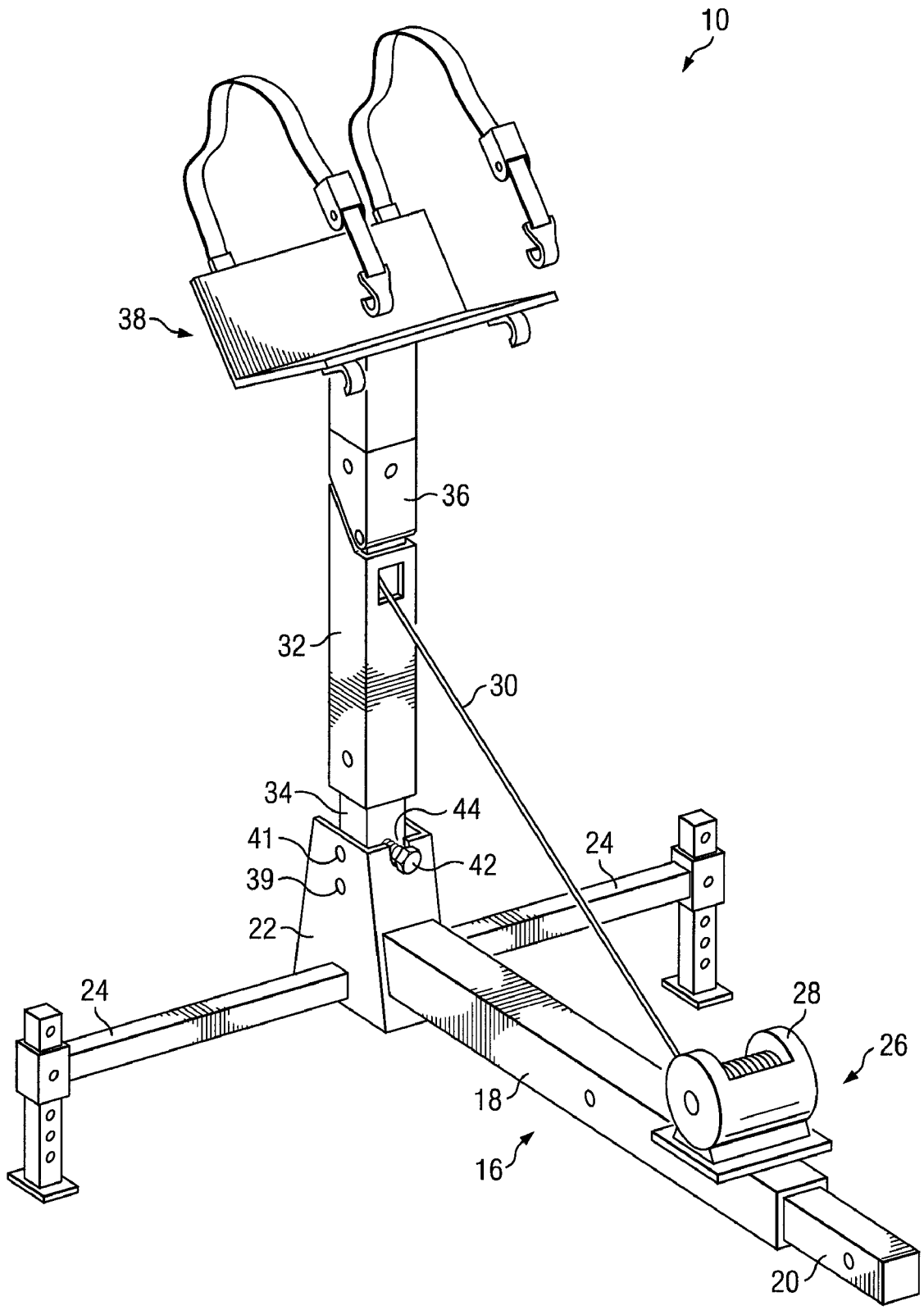
FIG. 2 is view of the game carcass system of FIG. 1 without the vehicle and with the adjustable retrieval arm in an upright position.

FIG. 2 is view of the game carcass system 10 of FIG. 1 without the vehicle 12 and with the adjustable retrieval arm 32 in an upright position. Frame 16 is clearly shown with main arm 18 and receiver adapter 20. Pivot mount 22 is shown connected to main arm 18 and outriggers 24 are shown extending from pivot mount 22. Adjustable retrieval arm 32 is in an upright position in pivot mount 22 and is supported by rope 30 extending from the drum 28 of winch 26 attached to main arm 18. Rope 30 extends from winch 26 through rope hole 40 in adjustable retrieval arm 32 to retrieving head 38. Rope 30 must be tough, strong and flexible, so would typically be a steel rope or very high strength synthetic rope. Winch 26 could be either an electric or human powered winch depending on several factors, such as cost, durability, ease of operation, and size of game to be retrieved. The winch 26 could also be powered by a power take off from a work truck or tractor. Finally, a hydraulic winch 26 may be practical for use with vehicles that have onboard hydraulic systems. A pivot pin 39 and locking pin 41 in first end 34 allow the adjustable retrieval arm 32 to pivot downward and be secured in an upright position. A locking nut 42 further secures adjustable retrieval arm 32 in an upright position by engaging nut slot 44 in pivot mount 22. Locking nut 42 would be tightened during transportation of the carcass system 10 or when a heavy carcass is on the carcass system 10. Locking nut 42 is simply loosened to allow pivoting of adjustable retrieval arm 32 when locking pin 41 is removed.

Figure 3A:
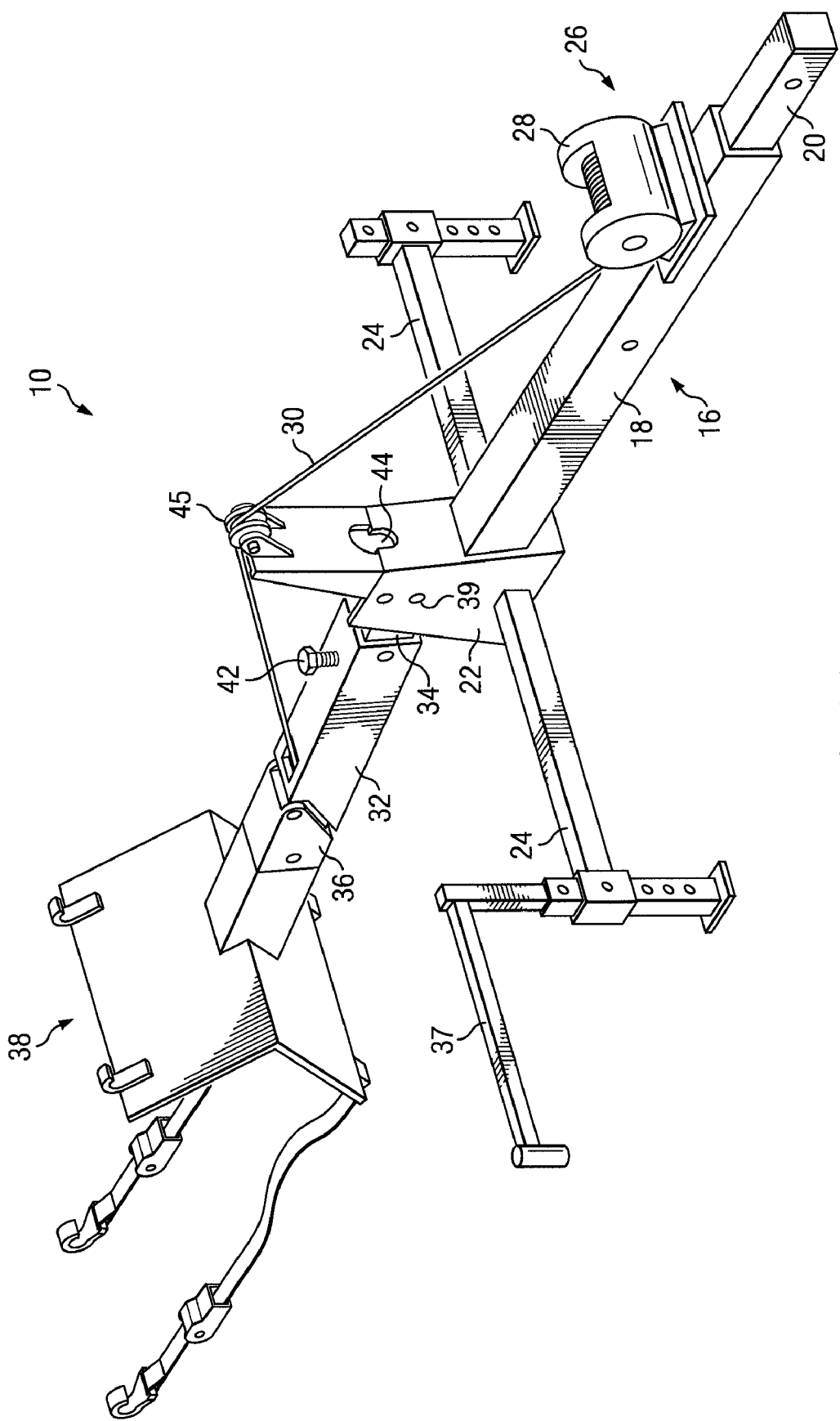
FIG. 3A is view of the game carcass system with the adjustable retrieval arm pivoted down ward.

FIG. 3A is view of the game carcass system 10 with the adjustable retrieval arm 32 pivoted down ward. Locking nut 42 is loosened to allow adjustable retrieval arm 32 to pivot downward and rope 30 nestles in leverage pulley 45 of pivot mount 22. An anti-drag bar 37 is shown attached to outrigger 24. The anti-drag bar helps with stabilizing the game carcass system 10 and may provide some ramping effect when lifting large carcasses.

Figure 3B:
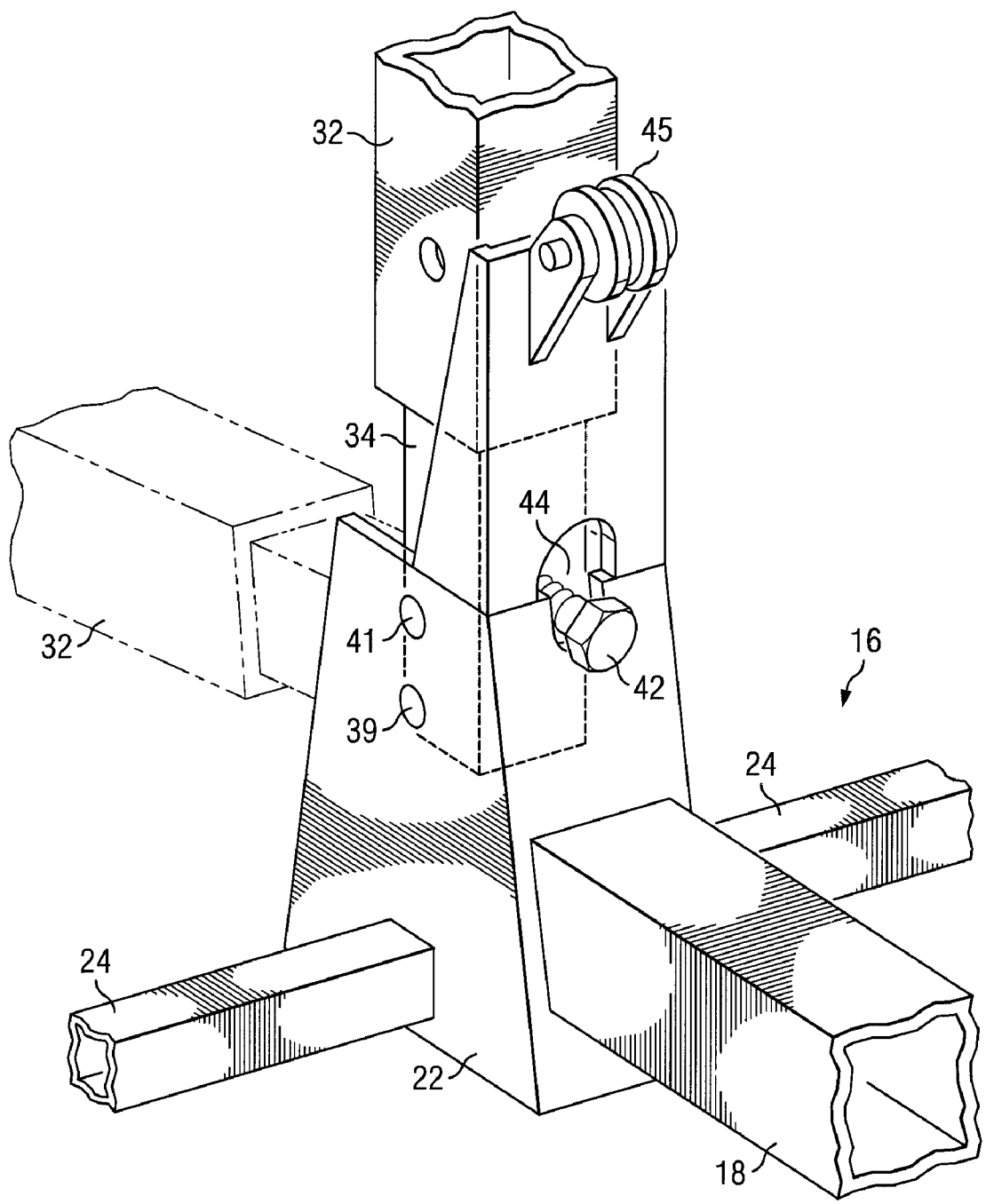
FIG. 3B is a further close-up of the pivot mount of the frame showing the adjustable retrieval arm in an upright position and a shaded version of the adjustable retrieval arm in a downward position.

FIG. 3B is a further close-up of the pivot mount 22 of the frame 16 showing the adjustable retrieval arm 32 in an upright position and a shaded version of the adjustable retrieval arm 32 in a downward position. The locking nut 42 is to stabilize and make the adjustable retrieval arm 32 rigid during transportation and heavy loads while the locking pin 41 is to secure it upright during normal usage. The redundancy may not be needed on all units.

Figure 4:
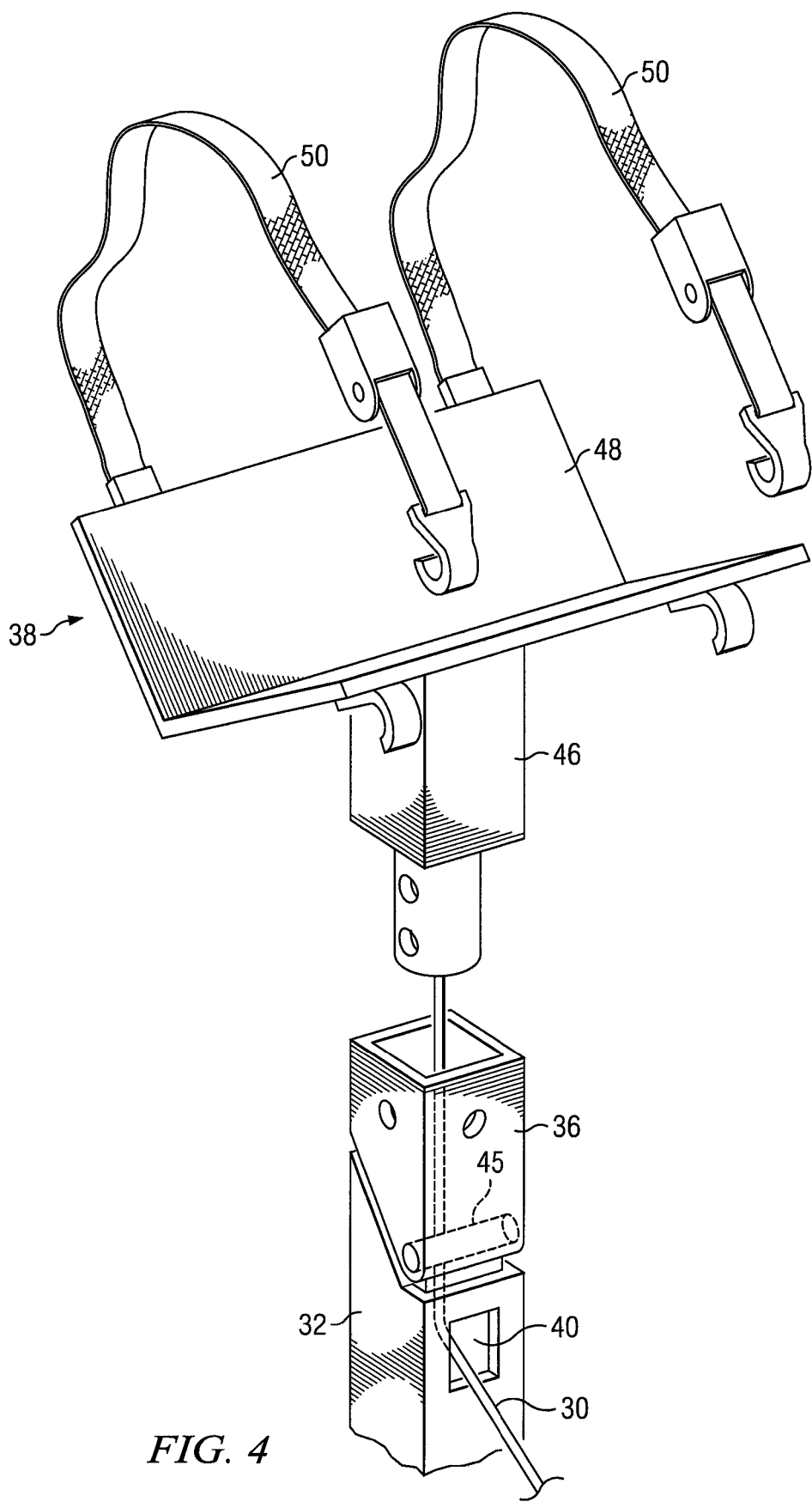
FIG. 4 is a further close-up of the retrieval head slightly removed from the retrieval arm.

FIG. 4 is a further close-up of the retrieval head 38 slightly removed from the adjustable retrieval arm 32. The upper end 36 of adjustable retrieval arm 32 is shown with dumping pivot pin 45 that allows the upper end 36 to pivot towards the vehicle 12 as will be discussed in FIG. 5D. Dumping pivot pin 45 also allows for rope 30 to smoothly transition from rope hole 40 to retrieving head 38. Retrieving head 38 is comprised of a base 46 that fits into the upper end 36 and a carcass support bar 48 that extends perpendicular to the base 46. Carcass support bar 48 is shown having a v-shaped section. The v-sectional shape helps to support a game carcass 52 (not shown in this Fig.) but other sectional shapes may be used for the carcass support bar 46, such as a c-sectional shape.

Attached to the carcass support bar 48 are tie downs 50. Tie downs 50 are used to secure a game carcass 52 to the carcass support bar 48. Two tie downs 50 provide sufficient strength to retrieve the carcass and some flexibility that allows for unfastening one tie down 50 at a time while processing the game carcass 52. More tie downs 50 may be used if desired for additional flexibility or strength.

Figure 5C:
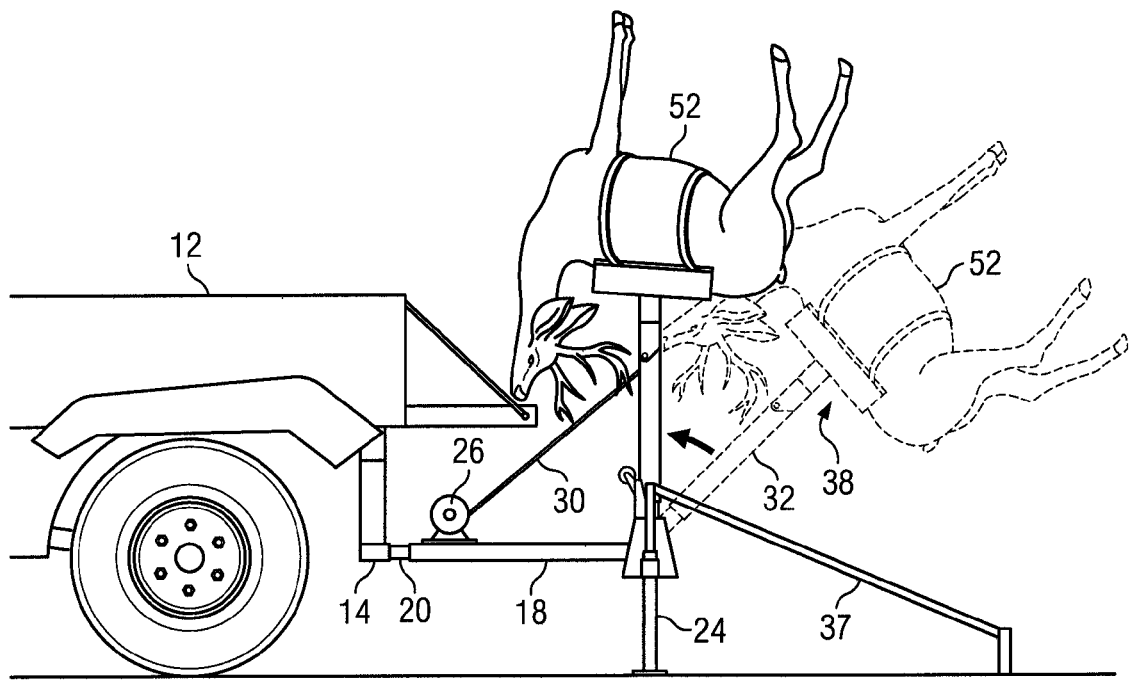

FIGS. 5A-5F is a scene-by-scene demonstration of how the game carcass system 10 may be used to retrieve a game carcass 52. In FIG. 5A the game carcass system 10 is attached to the vehicle 12 and the outriggers 24 are deployed to stabilize the game carcass system 10. The adjustable retrieval arm 32 is in an upright position and the tie downs 50 are unfastened. From this position the winch 26 can be unwound to allow the adjustable retrieval arm 32 to pivot downward away from the vehicle 12. As the winch continues to let out rope 30 the retrieval head 38 can be removed from the upper end 36 and extended to the location of the game carcass 52. Once the retrieving head 38 reaches the carcass 52 the tie-downs 50 are wrapped around the carcass so that the carcass support bar is aligned with the spine of the carcass 52. Tie downs 50 are typically fastened around the abdomen of the carcass 52 just inside of the front and rear legs of the carcass 52 as shown in FIG. 5B. Rope 30 is retracted by winch 26 to draw the carcass towards the vehicle 12. Retrieving head 38 is drawn towards the game carcass retrieval system 10 until base 46 is drawn into upper end 36. Further retraction of rope 30 by winch 26 will lift the adjustable retrieval arm 32, along with attached retrieving head 38 and carcass 52, into an upright position as shown in FIG. 5C.

Figure 5D:
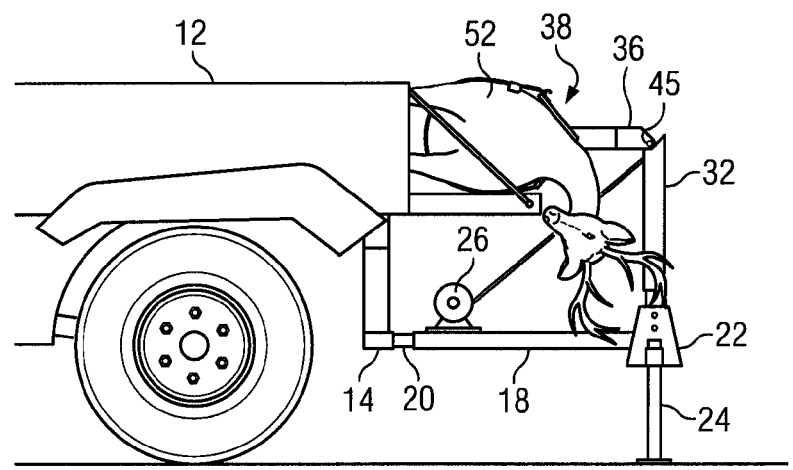

From the upright position shown in FIG. 5C the carcass 52 may be dumped into the vehicle 12 by allowing upper end 36 to pivot on dumping pivot pin 45, as shown in FIG. 5D. Also shown in 5C is the anti-drag bar 37 which may be used to help stabilize heavy loads. In this embodiment the anti-drag bar 37 is a inserted into the outrigger 24 at one end and pushed into the ground at another end.

Figure 5E:
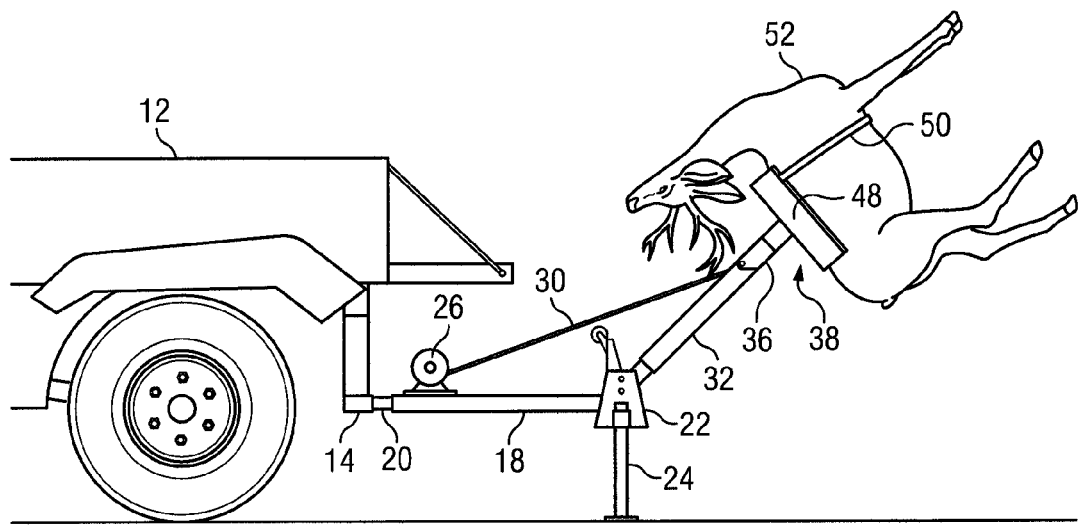
Figure 5F:
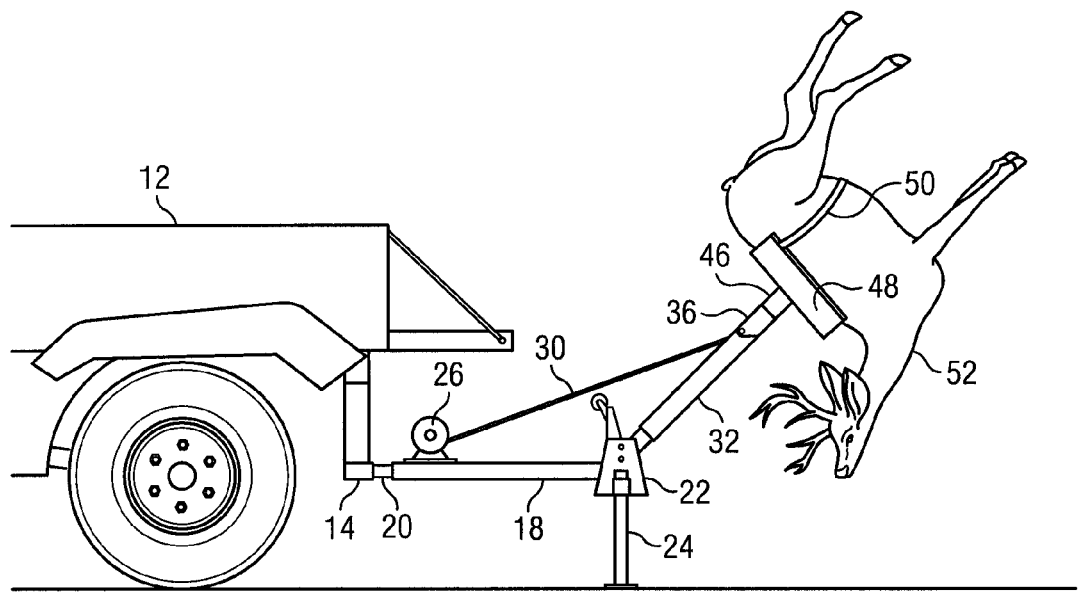

Alternatively, from the upright position shown in FIG. 5C the carcass may be turned and tilted away from the vehicle 12 to facilitate processing, as shown in FIGS. 5E and 5F. Retrieving head 38 may be rotated within upper end 36 to allow the carcass 52 to present various angles to aid in processing. In FIGS. 5E and 5F the carcass is supported by a single tie-down to allow better access. Also, the rope 30 supports the retrieval arm 32.

Figure 6:
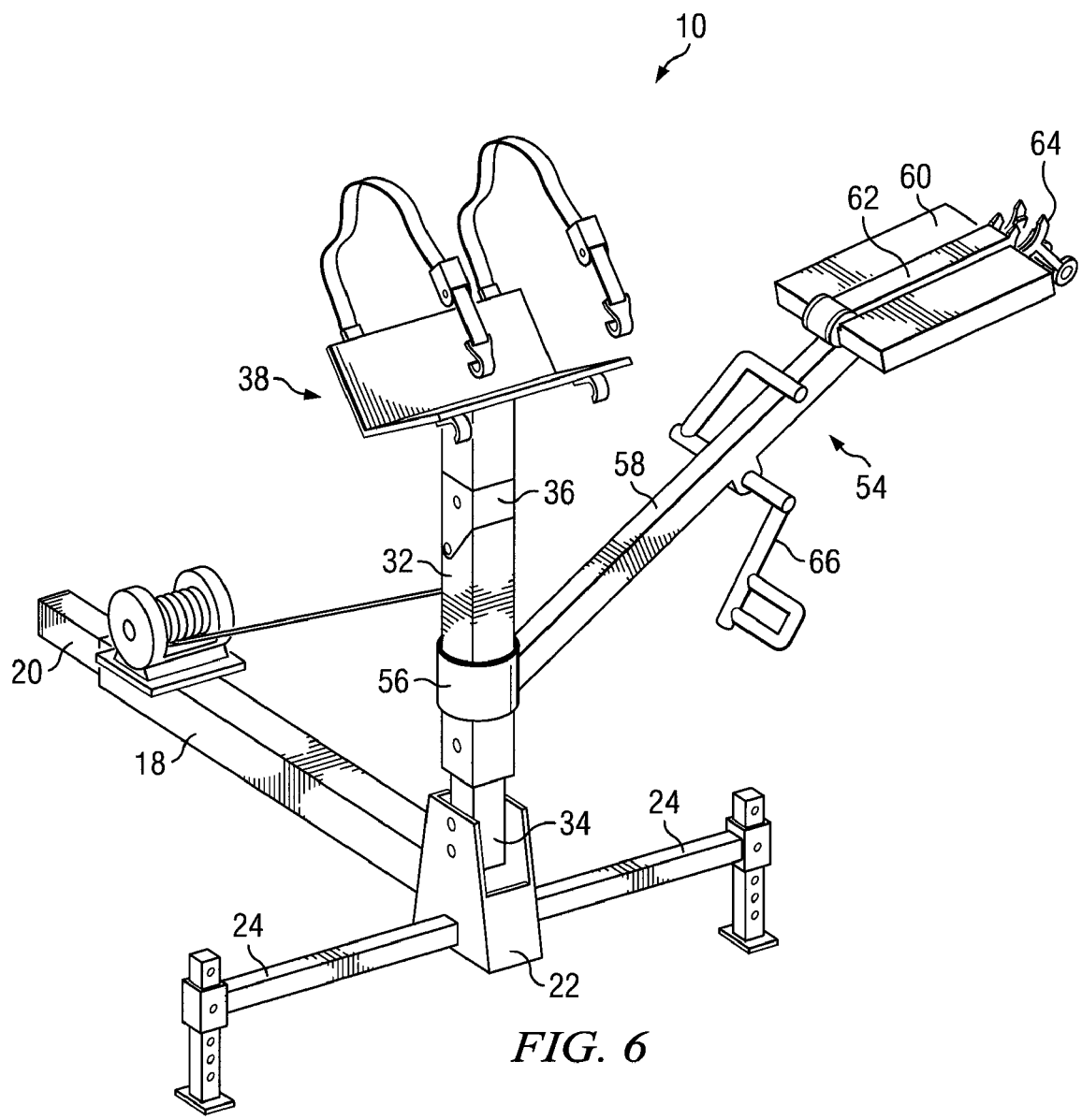
FIG. 6 is a view of the game carcass system with a processing table attached to the adjustable retrieval arm.

FIG. 6 is a view of the game carcass system 10 with a processing table 54 attached to the adjustable retrieval arm 32. processing table 54 includes a yoke 56 that may slide up and down adjustable retrieval arm 32 and a support arm 58 that is attached to the yoke 56. Support arm 58 extends up at an angle from yoke 56 to hold support surfaces 60 away from the adjustable retrieval arm 32, between the support surfaces 60 is a grapple arm 62 which pivots on support arm 58 on one end and has a meat grapple 64 opposite the pivot. A skinning arm 66 is piovtably attached to the support arm 58 of the processing table 54.

Figure 7A:
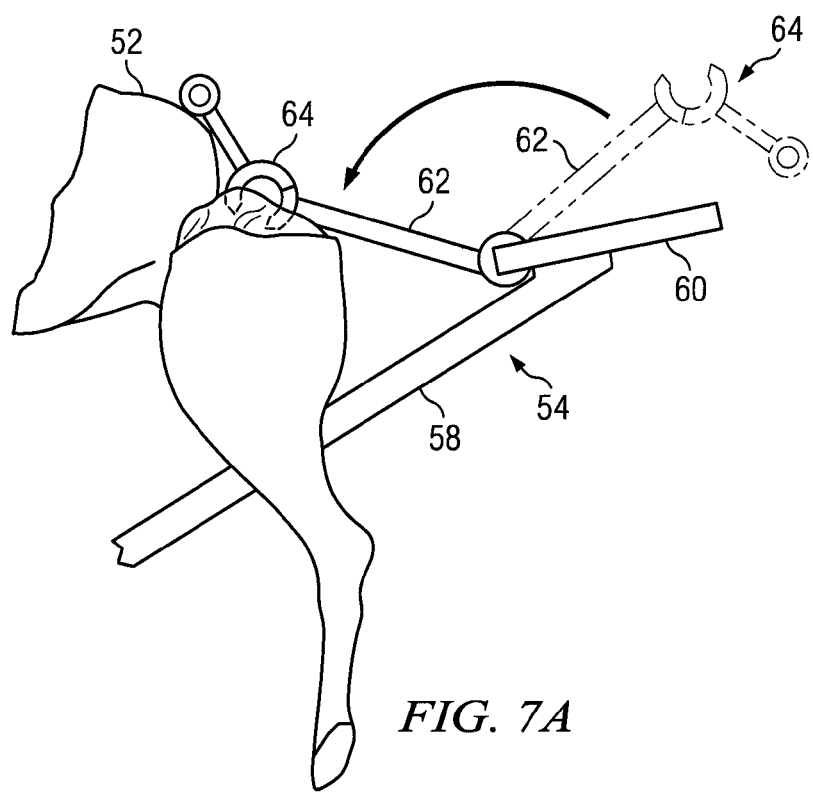
FIGS. 7A-7C is a scene-by-scene demonstration of how the grapple arm and skinning bar are used on the processing table.
Figure 7B:
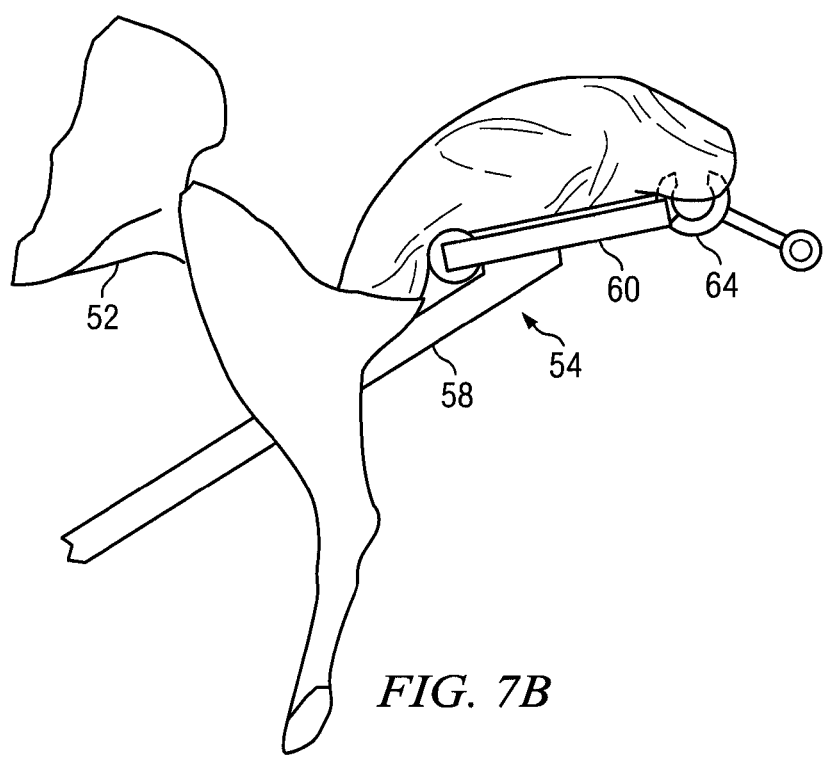
Figure 7C:
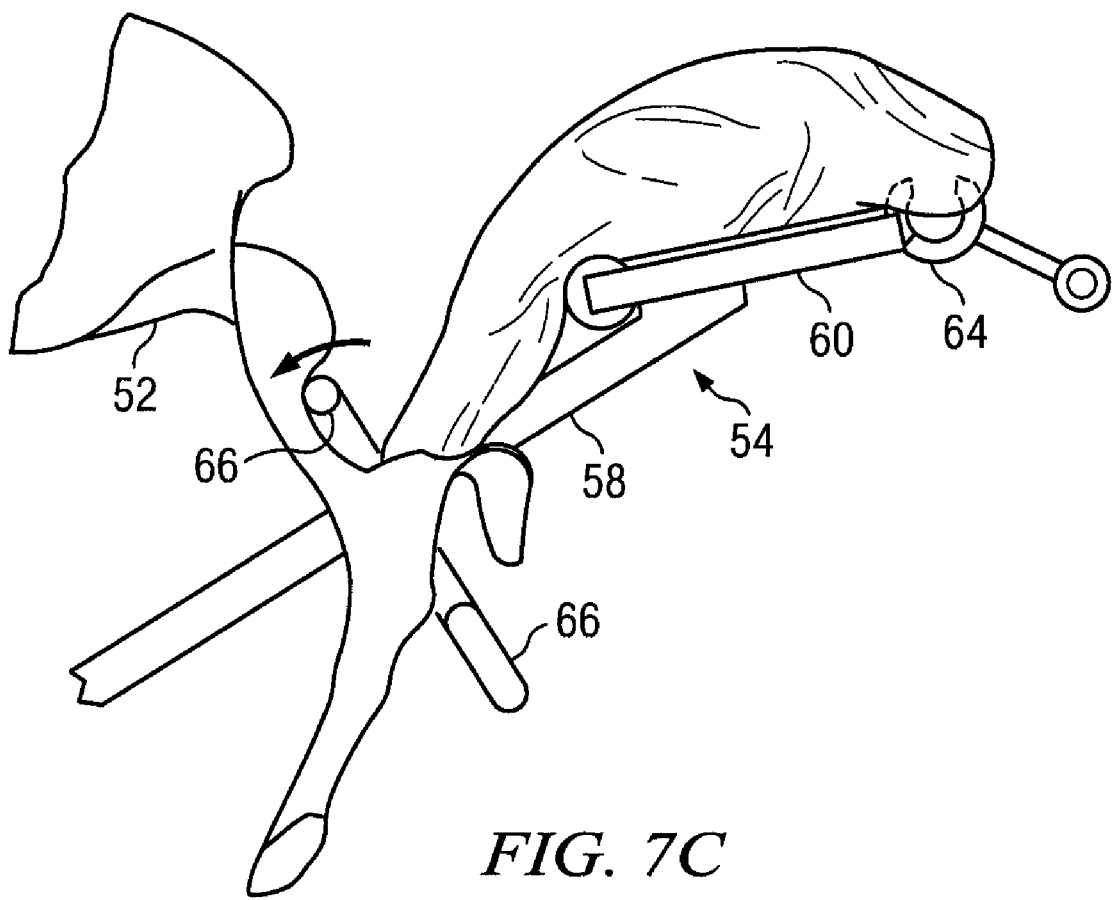

FIGS. 7A-7C is a scene-by-scene demonstration of how the grapple arm 62 and skinning bar 66 are used on the processing table 54. In FIG. 7A the grapple arm 62 is moved forward so that the grapple 64 may engage the meat of a carcass 52. Once engaging the meat the grapple arm is pulled back to lock the grapple 64 to meat of carcass 52 and finish pulling back to separate the meat from the carcass 52 as shown in FIG. 7B. In FIG. 7C the skinning arm 66 is slid between the meat secured by the grapple 64 and the remaining carcass 52 and rotated to separate the meat from the carcass 52 as shown.

What is claimed is:

1. A game carcass retrieval system comprising:
   a frame with a winch, the winch having a drum wrapped with a rope;
   wherein the frame has a square end that is sized to mate with a vehicle hitch receiver so that the frame may be attached to a vehicle, and wherein the frame has outriggers to support the frame while in use;
   an adjustable retrieval arm with a first end and a second end, the retrieval arm pivotally attached to the frame at the first end, and the retrieval arm having a bed pivot that allows the retrieval arm, when in a cleaning position, to pivot towards the vehicle to ease movement of a game carcass into the vehicle;
   a retrieving head removably mounted to the second end of the adjustable retrieval arm, the retrieving head comprising:
      a base shaped to mount to the second end of the retrieval arm;
      a carcass support bar attached to the base; and
      at least one tie-down strap to secure the game carcass to the carcass support bar; and
   wherein the rope extends from the frame to the base of the retrieving head such that when the rope is wound on the winch, the retrieving head is pulled into a mounted position in the retrieval arm and the arm pivots from a loading position to the cleaning position.

2. A game carcass retrieval system comprising:
   a frame with a winch, the winch having a drum wrapped with a rope;
   wherein the frame has a square end that is sized to mate with a vehicle hitch receiver so that the frame may be attached to a vehicle, and wherein the frame has outriggers to support the frame while in use;
   an adjustable retrieval arm with a first end and a second end, the retrieval arm pivotally attached to the frame at the first end;
   a retrieving head removably mounted to the second end of the adjustable retrieval arm, the retrieving head comprising:

a base shaped to mount to the second end of the retrieval arm;
a carcass support bar attached to the base;
at least one tie-down strap to secure a game carcass to the carcass support bar; and
a processing table rotably attached to the retrieval arm to support parts of the carcass during processing;
wherein the rope extends from the frame to the base of the retrieving head such that when the rope is wound on the winch, the retrieving head is pulled into a mounted position in the retrieval arm and the arm pivots from a loading position to a cleaning position.

3. The game carcass retrieval system according to claim 2 further comprising:
a grapple attached to the processing table to secure parts of the carcass to the processing table during processing.

4. The game carcass retrieval system according to claim 3 further comprising:
a skinning arm rotably attached to the processing table to be pulled between meat portions and skin portions of a part of the carcass secured to the processing table during processing.

5. The game carcass retrieval system according to claim 1 wherein:
the carcass support bar has a v cross section.

* * * * *